US010210685B2

(12) United States Patent
Borgmeyer

(10) Patent No.: US 10,210,685 B2
(45) Date of Patent: Feb. 19, 2019

(54) VOICE BIOMETRIC ANALYSIS SYSTEMS AND METHODS FOR VERBAL TRANSACTIONS CONDUCTED OVER A COMMUNICATIONS NETWORK

(71) Applicant: MasterCard International Incorporated, Purchase, NY (US)

(72) Inventor: Wayne A. Borgmeyer, Wentzville, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 18 days.

(21) Appl. No.: 15/603,107

(22) Filed: May 23, 2017

(65) Prior Publication Data

US 2018/0342121 A1 Nov. 29, 2018

(51) Int. Cl.
| | |
|---|---|
| G06F 17/00 | (2006.01) |
| G06K 15/00 | (2006.01) |
| G07C 9/00 | (2006.01) |
| G06K 19/07 | (2006.01) |
| G06Q 20/40 | (2012.01) |
| G06Q 20/34 | (2012.01) |

(52) U.S. Cl.
CPC ..... *G07C 9/00158* (2013.01); *G06K 19/0723* (2013.01); *G06Q 20/40145* (2013.01); *G06Q 20/34* (2013.01)

(58) Field of Classification Search
CPC ... G06F 21/32; G06F 21/31; G06C 20/40145; G06C 20/12

USPC ................ 235/380, 382, 375, 383
See application file for complete search history.

(56) References Cited

U.S. PATENT DOCUMENTS

| | | | |
|---|---|---|---|
| 5,613,012 | A | 3/1997 | Hoffman et al. |
| 5,615,277 | A | 3/1997 | Hoffman |
| 5,838,812 | A | 11/1998 | Pare et al. |
| 7,689,832 | B2 | 3/2010 | Talmor et al. |
| 8,407,112 | B2 | 3/2013 | Walter |
| 8,655,789 | B2 | 2/2014 | Bishop et al. |
| 9,047,604 | B2 | 6/2015 | Herder |
| 9,323,912 | B2 | 4/2016 | Schultz et al. |
| 2006/0000896 | A1 | 1/2006 | Bonalle et al. |
| 2007/0061590 | A1 | 3/2007 | Boye et al. |
| 2009/0006254 | A1 | 1/2009 | Mumm et al. |
| 2009/0313165 | A1 | 12/2009 | Walter |
| 2013/0159194 | A1 | 6/2013 | Habib |

(Continued)

*Primary Examiner* — Jamara Franklin
(74) *Attorney, Agent, or Firm* — Armstrong Teasdale LLP

(57) ABSTRACT

A voice biometric analysis system for authenticating a customer as am authorized payment card user to a merchant over a communications network includes a passive voice biometric analysis device configured to: store a plurality of respective voice samples of enrolled authorized payment card users; sample a verbal conversation between the customer and the recipient over the communications network; analyze the customer's voice characteristics from the monitored verbal conversation; compare, during the conversation, the analyzed customer's voice characteristics in the monitored verbal conversation to characteristics of at least one of the stored voice sample to authenticate the customer as one of the enrolled authorized payment card users; and advise the merchant whether the customer has been authenticated as an enrolled authorized payment card user.

20 Claims, 6 Drawing Sheets

(56) References Cited

U.S. PATENT DOCUMENTS

2014/0188730 A1\* 7/2014 Murgai ............ G06Q 20/40145
705/44
2015/0112682 A1 4/2015 Rodriguez et al.

\* cited by examiner

VOICE BIOMETRIC ANALYSIS SYSTEMS AND METHODS FOR VERBAL TRANSACTIONS CONDUCTED OVER A COMMUNICATIONS NETWORK

BACKGROUND

This disclosure relates generally to voice biometric analysis, and more specifically to authentication and authorization systems and methods including voice biometric analysis of a verbally conducted purchase transaction over a communications network.

Anti-fraud measures are of continuing concerns to issuers of payment cards such as debit cards and credit cards, as well as to cardholders and to merchants selling goods and services and accepting payment card payments therefor. For example, merchants receiving payment card payment offers by persons unknown to them desire some assurance that payment card purchases are validly made and that the merchant will receive payment from card issuers for goods and services provided. Issuing banks of payment cards seek effective and reliable ways to authenticate and validate card purchases as being made by an authorized person that is obligated to pay the issuer, or alternatively to detect possible fraudulent activity by an unauthorized person attempting to use a cardholder's account that an authorized person is generally not obligated to repay. Cardholders seek assurance that their card numbers cannot be used fraudulently by others to make unauthorized purchases that may be undetected by them for some period of time, and possibly even be inadvertently paid by them. Inconvenience and loss may be incurred by all parties if fraudulent payments made with payment cards go undetected.

Certain types of transactions, specifically transactions made over a communication network between purported cardholders and merchants at different locations, present specific challenges that are unresolved in the marketplace by existing anti-fraud measures. Cardholders, merchants, and card issuers would each benefit from anti-fraud measured tailored to meet the needs of such transactions, and improvements are accordingly desired.

BRIEF DESCRIPTION

In one aspect, the disclosure provides a voice biometric analysis system for authenticating a customer as an authorized payment card user to a merchant over a communications network includes a passive voice biometric analysis device configured to: store a plurality of respective voice samples of enrolled authorized payment card users; sample a verbal conversation between the customer and the merchant over the communications network; analyze the customer's voice characteristics from the monitored verbal conversation; compare, during the conversation, the analyzed customer's voice characteristics in the monitored verbal conversation to characteristics of at least one of the stored voice sample to verify an identity of the customer as one of the enrolled authorized payment card users; and advise the merchant whether the identity of the customer has been verified as an enrolled authorized payment card user.

In another aspect, the disclosure provides a caller authentication method for a verbal transaction between a customer and a recipient over a communications network. The method is implemented with a passive voice biometric analysis device and includes: storing a plurality of respective voice samples of enrolled authorized payment card users; sampling a verbal conversation between the customer and the merchant over the communications network; analyzing the customer's voice characteristics from the sampled verbal conversation; comparing, during the conversation, the analyzed customer's voice characteristics in the sampled verbal conversation to characteristics of at least one of the stored voice samples to authenticate the customer as an enrolled authorized payment card user; and advising the merchant whether the customer has been authenticated as an enrolled user.

DETAILED DESCRIPTION

Figure 1:
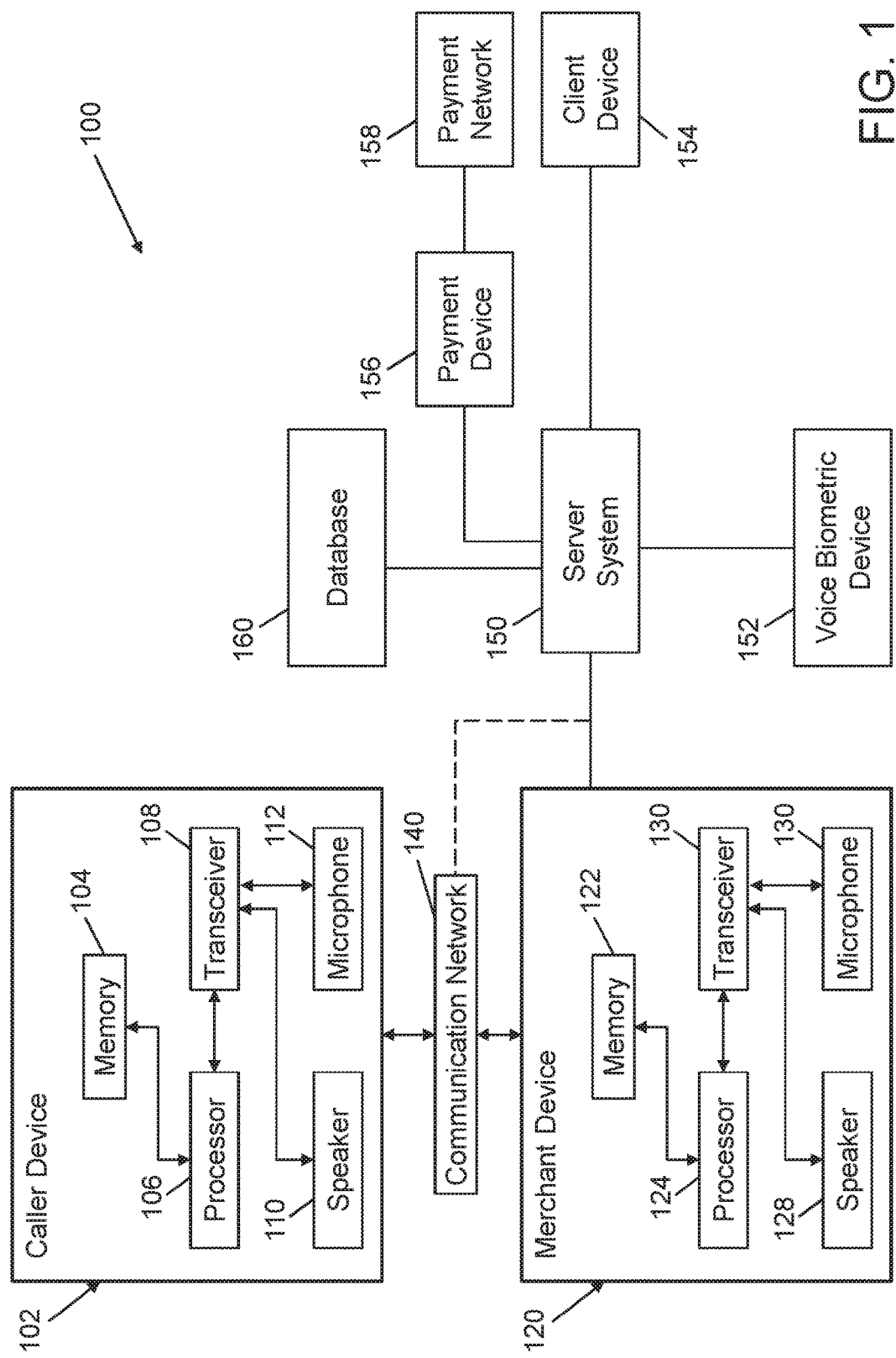
FIG. 1 illustrates an example embodiment of a biometric analysis system for authenticating a customer as an authorized payment card user to a merchant over a communications network.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure. The system and methods described herein are configured to address certain problems and challenges in authenticating an identity of a caller to a recipient such as a merchant to more securely and efficiently facilitate a business transaction, such as the processing of payment requests for purchases by a cardholder for goods or services of a merchant in a verbal transaction made over a communications network. Such problems and challenges are further discussed below followed by exemplary systems and methods that overcome such problems and challenges.

At present, phone-based cardholder transactions between a caller and merchant that are not in the same location and include payment using a payment card are generally handled in one of two ways. First, the caller orally communicates his or her payment card information over the phone to the merchant. The necessary payment card information typically includes the name of the payment card processor (e.g., Mastercard®, Visa®, American Express®), the name of the cardholder as it appears on the card, the primary account number (PAN) or the card number provided on the front of the card, the cardholder's billing address, card expiration information, and any security codes. The merchant can input the payment card information to a payment processing system that compares the information provided to information of record. Second, the cardholder may be prompted to provide a predetermined password, personal identification number (PIN), or answer a security question that is generally known only by the authorized cardholder and may therefore be used to authenticate the transaction and complete the transaction without having to provide further and more detailed payment card information. The password, PIN or security question/answer is linked to the detailed payment card account information on file in with the merchant that can be used to complete the payment transaction. While both techniques above can be effective to complete transactions with payment cards, they are not without drawbacks and improvements are desired.

In the former case wherein the cardholder orally communicates his or her card information to the merchant, an oral exchange of the necessary payment card information can be a tedious process for the cardholder and also the merchant to complete successfully and efficiently. Errors are often made in providing or recording all of the needed payment card information correctly over a phone conversation between the cardholder and merchant. Cardholders tend to have to repeat information, including spelling of names and portions of addresses that may not apparent to the merchant. Lengthy PAN numbers and numeric address information can easily be mistakenly provided or misheard, and also may have to repeated by the cardholder in order for the merchant to understand it. In turn, merchants tend to have to repeat the information provided back to the caller for confirmation. Noisy environments or disruptions on either the cardholder or merchant's end of the conversation can lead to a trial and error exchange of card information that can be inconvenient to both sides. Extended interaction time to correct errors is needed to successfully complete the transactions are undesirable to both the cardholder and the merchant. To many a cardholder and a merchant, this amounts to an unwelcome experience.

Also, the caller usually needs the payment card in hand to reliably provide at least some of the information needed, which can sometimes be inconvenient and lead to delay in a call being made to the merchant in the first instance, or a delay during the conversation with the merchant while the cardholder retrieves the card with the merchant already on the line. Privacy issues are also of concern to cardholders that must verbally provide cardholder information to a merchant in a phone call, which can in some cases make cardholders reluctant to make orders at all, and in other case cause delays in orders until the cardholder reaches a sufficiently private place to talk to the merchant. At least some merchants may have similar concerns in having to speak and record cardholder information in an environment that is not clearly private.

Aside from the general difficulties and inconvenience described above when the caller actually is an authorized cardholder, from an anti-fraud perspective, an oral exchange of payment card information is susceptible to fraudulent activity by another party. As the actual identity of the caller is unknowable to the merchant, any party that is able to provide complete card information is able to complete a purchase. Unfortunately, card information is vulnerable to being misappropriated, stolen or improperly obtained by increasingly sophisticated criminal enterprises that seek to exploit weaknesses in the ability of authorized cardholders, merchants and card issuers to protect such information. Instances of online hacking, data breaches, and/or phishing schemes that may collect cardholder and card information are commonplace today. As it stands, merchants and card issuers are not well positioned to detect purchases made with complete and correct card and cardholder information but by someone other than the authorized cardholder. If another party besides the actual cardholder or a reputable merchant obtains the card and cardholder information, their attempts to make payment card purchases are highly likely to succeed.

At least in part to address some of the concerns above, phone-based transactions between cardholders and merchants may alternatively be completed using a predetermined password, PIN or security question/answer instead of exchanging the detailed card and cardholder information described above. Based on the password, PIN or security question/answer that is generally known only by an authorized cardholder, more detailed card information stored on file may be retrieved to complete the transaction without the cardholder having to provide it to the merchant. Password-based, PIN-based or security question/answer-based transactions may therefore be completed much more quickly and easily than the more detailed oral exchange of card and cardholder information described above. Correctly remembering the password, PIN or security question/answer correctly presents challenges to many cardholders, however, especially when the passwords, PINs and security questions are infrequently needed or used.

For cardholders that do frequently use their password, PIN or security questions/answers, there is still much opportunity for confusion and mistake. Passwords, PINs and security questions/answers are typically resettable at the option of the cardholder, and in many cases are frequently reset by cardholders. Indeed, some of the resets are made because the cardholders cannot remember their password, PIN or security question answers that are in place. Also, new cards are issued as older cards reach expiration, and this often triggers new passwords, PINs and security questions when the cards are activated. New cards are sometimes issued (or re-issued) because of successful fraud detection measures that identified previous transactions as actually or potentially fraudulent. New or re-issued cards in such circumstances may include different account numbers, triggering new passwords, PINs and security questions/answers.

Considering that many cardholders typically own a number of different cards and accounts with different passwords, PINs and security questions/answers that are subject to change over time as discussed above, keeping track of the respective current password, PIN or security question across a number of multiple payment cards and accounts can be daunting to at least some users, and some confusion is inevitable for many of them when asked for any particular password, PIN or security question/answer. Some delay in providing the correct password, PIN or security question answer may be incurred if the cardholder cannot quickly remember a password, PIN or security question/answer at all; if the cardholder confuses passwords, PIN or security question answers of one payment card with another; or if the cardholder confuses current passwords, PIN or security question answers with previous ones for any given payment card with an older password, PIN or security question that have been reset.

Further, the convenience of a password, PIN or security question-based transaction must also be balanced with the ease of which a password, PIN or security question answer may be misappropriated if overheard or not sufficiently protected. Especially in an oral transaction, having to verbally provide a password, PIN or security question/answer may be an impediment to making a purchase to at least some users. Privacy issues are again of concern and may present limitations to when transactions can be safely conducted. From an anti-fraud perspective, if another party besides the actual cardholder learns the password, PIN or security question/answers the payment card is rendered highly vulnerable to fraudulent activity by the other party. Even if the cardholder is careful to provide the password, PIN or security question answer in a private and secure manner, the password, PIN or security question could be overheard or otherwise obtained on the merchant side of the conversation. As mentioned above, instances of online hacking, data breaches, and/or phishing schemes that may collect cardholder and card information are commonplace today, and improperly obtained passwords, PINs and security questions/answers allow for even easier fraudulent attempts to use payment cards with a high likelihood of success. Merchants and card issuers generally accept the password, PIN and security question/answer as they lack ability to detect exactly who is providing them in a phone-based transaction.

Systems and methods are known in which a call back verification process is made to authenticate phone-based transactions. For example, once a caller attempts to use a specific payment card to make a purchase, the conversation with the merchant is terminated, and a second or return call is made from the merchant (or from a card issuer) to a contact number stored on file with the payment card information. The second return call is made to ask the person contacted, typically the authorized cardholder, to confirm the card payment request and verify the transaction. The return call may also include measures to confirm that the actual cardholder answers the return call and not someone else. Such measures may include active biometric voice analysis features. While such systems can be effective to provide additional security to a transaction and more reliably detect fraudulent activity, authorized cardholders may find the return call requirement to be a nuisance and a burden. Also, the return calls introduce some expense and inefficiency in completing transactions in a desired timeframe. If the return call is not immediately answered, additional costs and delay are incurred in completing transactions.

Systems and methods are also known in which the caller is required to call back to a second number for the purpose of verifying the caller's identity as an authorized cardholder. For example, once a caller attempts to use a specific payment card to make a purchase from a merchant, the merchant directs the caller to place a second call to another phone number to complete the transaction. The second phone number may be answered by a separate system that is designed to confirm that the authorized cardholder is placing the second call to confirm the transaction and not someone else. Active biometric voice analysis features may be used for this purpose. As above, while such call back systems can be effective to provide additional security to a transaction and more reliably detect fraudulent activity, authorized cardholders may find the call back requirement to be a nuisance and a burden.

In view of the above, faster, easier, more convenient, and more secure transaction authentication systems and methods are desired that may be completed in a single call (i.e., do not require a return call or a call back as described above). Systems and methods are likewise desired that reduce privacy concerns and security risks in conducting phone-based transactions between cardholders and merchants using payment card payments. Existing systems and methods have yet to completely meet the needs of the marketplace in these aspects, and improvements are desired.

The methods and systems described below overcome the difficulties described above and beneficially facilitate transaction authentication and authorization in a single call with a reduced transaction time. The systems and methods eliminate oral exchanges of actual card information as well as conventionally used passwords, PINs and security question answers while offering more efficient payment processing and improved security with reliable anti-fraud detection capability.

More specifically, the systems and methods described below include automated, computer-implemented voice biometric analysis to authenticate an identity of a caller by sampling a conversation between a caller and a recipient over a communications network, such as a phone-based conversation between a caller and a merchant in a verbal transaction for goods or services, and comparing the caller's voice to a previously analyzed voice sample or voiceprint of an enrolled cardholder. The voiceprint is stored on the system and analyzed characteristics of a caller's voice are electronically compared to characteristics of the voiceprint in real time while the caller converses with the merchant in natural conversation. If the characteristics of the caller's voice match the characteristics of the voiceprint, the system can reliably confirm that the caller is the cardholder. In other words, the caller's voice is utilized to self-authenticate and verify a transaction as it is being made.

In the systems and methods of the disclosure, card information is stored on file in the system can be linked to the stored voice sample or voiceprint, and if a match between the caller's voice and the analyzed voiceprint is determined the card information on file may be used to complete a payment transaction in an automated manner without further input from the caller or the merchant. That is, when the caller is identified as the cardholder while speaking with the merchant, as confirmed by the biometric voice recognition feature in the system, the payment card payment may be made without the caller having to verbally provide any actual card information, and without the caller having to provide a password, PIN or security question answer. Likewise, the merchant does not have to input any actual card information, or any password, PIN or security question/answer to a payment system for the payment to be authenticated or verified. The merchant accordingly has no need to obtain any card information, any password, any PIN, or any security question/answer in order for the transaction to proceed, and from a security perspective the transaction can be completed without the merchant ever knowing any card information that could be misappropriated. Payment card payments may accordingly be authenticated, verified, and completed in a single call, with a reduced amount of time and with a much improved experience to both the cardholder and the merchant with a high degree of security and assurance that fraud may be quickly and reliably detected before any payment card payment transaction is completed.

The payment transaction may be performed by a payment device or payment system and network of the card issuer, with the card issuer being sent notice of the voice biometric caller authentication for anti-fraud record purposes. Because of the voice recognition features of the system, only a caller who is actually the cardholder can complete a phone-based transaction using an enrolled payment card. Fraudulent activity by third parties is effectively prevented, and also easily detected if tried, by the failure of the system to confirm that the caller's voice is the cardholder's voice. Since the systems and methods of the disclosure facilitate complete authentication and verification in a single call as the caller and merchant converse to make a transaction, return calls or call backs are not required to complete authentication and verification of transaction, and related time and expense as well as burdens to issuers and cardholders is avoided.

In one embodiment, the disclosure provides a voice biometric analysis system for authenticating a caller as an authorized payment card user to a merchant over a communications network. The system includes a passive voice biometric analysis device configured to: store a plurality of respective voice samples of enrolled authorized payment card users; sample a verbal conversation between the customer and the merchant over the communications network; analyze the customer's voice characteristics from the sampled verbal conversation; compare, during the conversation, the analyzed customer's voice characteristics in the sampled verbal conversation to characteristics of at least one of the stored voice sample to authenticate the customer as one of the enrolled authorize payment card users; and advise the merchant whether the caller has been authenticated as an enrolled authorized payment card user.

When the conversation includes a verbal purchase request from the customer and a request for payment with a payment card, the passive voice biometric analysis device is further configured to: if the customer has been authenticated as an enrolled authorized payment card user, automatically retrieve stored payment card information linked to the stored voice sample of the enrolled authorized payment card user so that the request for payment with the payment card may be processed without payment card information being verbally exchanged in the conversation. If the identity of the customer is not verified as an enrolled authorized payment card user, the passive voice biometric analysis device is configured to generate an alert to the merchant.

The passive voice biometric analysis device may also be configured to record the voice samples as the authorized payment card users are being enrolled. The passive voice biometric analysis device may also be configured to analyze the stored voice samples. The passive voice biometric analysis device may be a server system. The system may include a database, the database including the plurality of stored voice samples, and the passive voice biometric analysis device may be configured to select at least one of the plurality of stored voice samples in the database based on the analyzed customer's voice characteristics in the sampled verbal conversation.

The system may also be configured to generate at least one of an ISO 8583 compliant message or an ISO 20022 compliant message. The system may include a payment device in communication with the passive voice biometric analysis device, and the payment device may be a payment card payment device communicating with a payment network.

In another embodiment, the disclosure provides a caller authentication method for a verbal transaction between a customer and a merchant over a communications network. The method is implemented with a passive voice biometric analysis device and includes: storing a plurality of respective voice samples of enrolled authorized payment card users; sampling a verbal conversation between the customer and the merchant over the communications network; analyzing the customer's voice characteristics from the sampled verbal conversation; comparing, during the conversation, the analyzed customer's voice characteristics in the sampled verbal conversation to characteristics of at least one of the stored voice samples to authenticate the customer as an enrolled authorized payment card user; and advising the merchant whether the customer has been authenticated as an enrolled authorized payment card user.

When the conversation includes a verbal purchase request from the customer and a request for payment with a payment card, the method may also include: if the customer has been authenticated as an enrolled authorized payment card user, automatically retrieving stored payment card information linked to the enrolled authorized payment card user without the cardholder information being verbally exchanged between the customer and the merchant. If the identity of the customer has not been authenticated as an enrolled user, the method may include generating an alert to the merchant.

The method may also include recording the voice samples as authorized payment card users are enrolled, analyzing the stored voice samples, accepting payment card information, and storing the payment card information in a manner linked to the stored voice sample of each enrolled authorized payment card user. The method may further include storing a plurality of stored voice samples for a plurality of enrolled authorized payment card users in a database, and selecting at least one of the plurality of stored voice samples in the database based on the analyzed customer's voice characteristics from the monitored verbal conversation.

The caller identification method may also include generating at least one of an ISO 8583 compliant message or an ISO 20022 compliant message, communicating with a payment device, and communicating with a card issuer payment network.

The technical problems addressed by the authentication and verification systems and methods of the disclosure include at least one of: (i) inability to detect fraud in processing a verbal cardholder transaction when the cardholder and merchant are not in the same location; (ii) inability to avoid human error in exchanging verbal information to complete a cardholder transaction; (iii) inability to efficiently and reliably verify an identity of an authorized cardholder in a phone-based transaction; (iv) inability to prevent misappropriation of payment card information in verbal conversations; (v) inability to complete payment card purchase transactions in a desired timeframe; (vi) inability to avoid reliance on person's in security aspects of cardholder transactions; (vii) inability to implement automated caller verification and security without disrupting normal human interaction, and (viii) inability to electronically authenticate a caller's identity in a verbal transaction made in a single call.

The authentication and verification systems and methods of the disclosure may be implemented using computer programming or engineering techniques including computer software, firmware, hardware, or any combination or subset thereof, wherein the technical effects may be achieved by (i) enrolling payment cardholders by obtaining voiceprints that may be analyzed using biometric voice recognition technology, (ii) determining voice characteristics of the voiceprint of an enrolled cardholder for authentication and verification purposes in a future verbal transaction between a caller and a merchant over a communications network; (iii) performing electronic and automated caller identification in real time during the verbal transaction using passive biometric voice recognition techniques that do not require a second call to be placed for analysis to be completed, (iv) based on analyzed characteristics of a caller's voice in comparison to analyzed characteristics of the voiceprint, electronically confirming that a caller is an authorized cardholder; (v) electronically accepting and verifying payment card fee payments without verbal exchange of payment card information, passwords, PINs or security questions/answers, (vi) electronically providing authentication and authorization to a card issuer payment device based on the biometric voice recognition analysis and comparison during a single call between a merchant and a caller; and (vii) electronically generating automatic fraud alerts when the biometric voice recognition analysis cannot confirm a caller to be an authorized cardholder in a single phone call.

The resulting technical benefits achieved by the authentication and verification systems and methods include at least one of: (i) electronic verification of caller identity as an authorized cardholder solely by electronically monitoring a single verbal conversation, (ii) securely completing transaction completion and electronic payment card payment processing without human exchange of cardholder information in the verbal conversation, (iii) completing transaction completion and payment card payment electronically without human error in providing payment card information, (iv) reducing payment card transaction time while improving card information security, and (v) providing electronic authentication, authorization, and fraud detection capability without disrupting normal human interaction between a caller and a merchant.

In one embodiment, a computer program is provided, and the program is embodied on a computer-readable medium. In an example embodiment, the system may be executed on a single computer system, without requiring a connection to a server computer. In a further example embodiment, the system may be run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

Embodiments described herein may relate to a transaction card system, such as a credit or debit card payment system using the Mastercard® or Visa® payment network. The Mastercard® payment network is a set of proprietary communications standards promulgated by Mastercard International Incorporated® for the exchange of financial transaction data and the settlement of funds between financial institutions that are members of Mastercard International Incorporated®. (Mastercard is a registered trademark of MasterCard International Incorporated located in Purchase, N.Y.).

FIG. 1 illustrates an example embodiment of an authentication and verification system 100 for a verbal transaction made between a caller and a recipient, such as merchant in one example, over a communications network. The system 100 as shown includes a caller device 102, a recipient or merchant device 120 and a communication network 140 over which a verbal business transaction between a caller and a merchant may be conducted.

The caller device 102 in the example shown includes a memory 104, a processor 106, and a transceiver 108 capable of bidirectional voice communication, and in some embodiments bidirectional data exchange as well, with another device such including those described above according to known wired or wireless communication protocols. The caller device 102 also includes a speaker 110 and a microphone 112 to facilitate a verbal conversation with another person through the caller device 102 using known techniques and methods. In some cases the caller device 102 may optionally include video transmission capability that also incorporates the speaker 110 and microphone 112 for the caller to participate in video conference or web-chat with another party.

The merchant device 120 in the example shown includes a memory 122, a processor 124, and a transceiver 126 capable of bidirectional voice communication, and in some embodiments bidirectional data exchange as well, with another device such including those described above according to known wired or wireless communication protocols. The merchant device 120 also includes a speaker 128 and a microphone 130 to facilitate a verbal conversation with another person through the merchant device 120 using known voice transmission techniques and methods. In some cases the merchant device 120 may include video transmission capability that also incorporates the speaker 128 and microphone 130 for the merchant to participate in video conference or web-chat with another party.

The caller device 102 and the merchant device 120 are each configured to facilitate a verbal conversation between the caller and the merchant over a communications network 140. The communication network 140 may by any known communication network that is suitable for voice transmission between the caller at one location and the merchant at another location using the respective devices 102 and 120. As such, the communication network 140 in non-limiting examples may be a public switched telephone network (PSTN), a cellular network, a computer network, the Internet, as well as combinations of (PSTN), a cellular network, a computer network, and the Internet. In the case of computer devices, computer networks, and computer devices connected to the Internet, various protocols are known for transmitting human voices from device to device, including but not necessarily limited to Voice over Internet Protocol (Voice over IP, VoIP and IP telephony) protocols. The caller device 102 and the merchant device 120 in various examples may be any type of device that can facilitate voice transmission between the caller and the merchant, including but not limited to: conventional telephones communicating over a PSTN; cellular phones communicating over a cellular communication network; web phones, Internet phones, other ones of various types of available computer devices such as a laptop or notebook computer, a tablet device or a smartphone communicating over a computer network over the Internet, etc.; or a hybrid device such as a tablet device or a smartphone having capability to communicate via cellular networks and/or computer networks. In contemplated embodiments, the caller and merchant and their respective devices 102 and 120 are at locations that are geographically remote from one another, although remoteness is not necessarily required so long as the connection is made between the caller and the merchant using the respective devices 102 and 120 over the communications network 140.

Generally, in contemplated embodiments, the caller and the merchants are relationally unknown to one another and cannot see one another as they converse, although in the case of a video conference or web-chat they may see one another in some instances, but still be unfamiliar to one another so that neither party is able to visually confirm the actual identity of the other party. The systems and methods of the disclosure may be utilized, however, by callers and merchants that do know one another, in which the systems and methods serve as an independent caller identity and verification tool and record keeping purpose for the card issuer that has no personal relationship with the caller or merchant.

Voice communication between the caller and the merchant recipient over the network 140 via the devices 102 and 120 is generally referred to in the present disclosure as a "phone-based" conversation even though a phone device (e.g., a telephone or smartphone) may not actually be used. Likewise, the purchaser that needs to be identified is generally referred to as a "caller" herein whether or not the purchaser actually places a phone call in a traditional sense using a phone device. Also, in a situation wherein a merchant may initiate a conversation with a potential customer/purchaser, the merchant shall still be considered a "recipient" and the proposed customer/purchaser is considered a "caller" for purposes of the present description. Considering a verbal transaction between them, the "caller" is the one seeking to buy goods or services from the merchant recipient (i.e., the seller of the desired goods or services), regardless of which party initiates the conversation. In the example described, the caller is customer/purchaser and the recipient is a merchant with the caller's identity being authenticated to securely and efficiently complete a business transaction between them. In another example, the recipient need not necessarily be a merchant but can be another party that desires caller identity authentication for other reasons.

The system 100 may also include a server system 150 that may communicate with the merchant device 120 as well as voice biometric analysis device 152, a client device 154, an optional payment device 156 and payment network 158 (e.g., a network connecting a merchant, an acquiring bank, a payment processor, an issuer bank, etc. in a multi-party payment-by-card transaction system), and a database 160 as described further below. The server system 150 may communicate with, request, accept and retrieve data and information from each of the devices 120, 152, 154, 156 and the database 160 as explained below.

In contemplated examples, the voice biometric analysis device 152 is connected directly or indirectly to the merchant device 120 or the communication network 140 and accordingly is able to receive a real time transmission of the caller's voice from the caller device 102 while the caller is talking to the merchant via the merchant device 120. While one voice biometric analysis device 152 is shown in FIG. 1, multiple voice biometric analysis devices 152 may be provided and utilized by different merchants using additional merchant devices 120 at various different locations. Each merchant may be provided with an identifier such that multiple merchant devices in the system 100 may be simultaneously connected to and distinguished by the system 100 to facilitate payment card transactions between the caller and different merchants.

In contemplated embodiments the voice biometric analysis device 152 is a passive voice biometric analysis device configured to sample or monitor a portion of the verbal conversation between the caller and the merchant over the communications network 140. The voice biometric analysis device 152 receives the audio feed from the caller device 102 or the merchant device 120 and accordingly can listen to the caller's voice as the caller speaks to the merchant. As the device 152 listens to monitored portion of the conversation, the voice biometric analysis device 152 utilizes passive biometric voice recognition techniques, as opposed to active voice biometric analysis, in order to determine whether or not the caller's voice corresponds to an authorized payment cardholder.

Active voice biometric analysis, as referred to herein, includes acoustic analysis of specific words, phrases, or sentences spoken by the caller in comparison to a previously provided voice sample system that includes the same specific words, phrases or sentences. Active voice biometric systems require the caller to be prompted to say the specific words, phrases or sentences in the conversation in order to determine if the caller's voice matches the sample or not, and as mentioned above active voice biometric analysis has been used in return call or call back systems. Such active voice biometric analysis and related prompts can present an awkward disruption of natural conversation between the caller and merchant in the systems and methods of the present disclosure that desirably provide analysis in a single call. An improved caller and merchant experience is provided at least in part by avoiding or eliminating otherwise awkward prompts and the like that active voice biometric analysis present, and that also can extend the conversation time to include any necessary explanation to the caller concerning the prompted specific words, phrases or sentences. Also, further conversation time may be required if for any reason the caller does not correctly hear or understand the specific words, phrases or sentences being prompted for active voice biometric analysis to be conducted, or if the prompt has to be given more than once before the caller can successfully repeat it.

In contrast to active voice biometric analysis described above, the device 152 in the system 100 is configured to perform passive voice biometric analysis. As referred to herein, passive voice biometric analysis does not rely on a direct comparison of specific words, phrases or sentences spoken by the caller to the same specific words, phrases or sentences in a voice sample in order to determine whether or not the caller's voice corresponds to an authorized payment cardholder. Instead, passive voice analysis first analyzes the voice sample to determine a set of unique characteristics of a person's voice that can be generally compared at a later time to a caller's voice to determine if the same or different person is calling. Generally speaking, each person has a unique set of speech patterns and exhibits unique acoustic characteristics while speaking that can be distinguished from other persons. The passive biometric voice analysis identifies the unique characteristics of the person's voice as determined from a voice sample, and then looks for the same unique characteristics in a sampled portion of the conversation in the call to determine if a caller is the same or different person, even though there is no direct match between the actual content of the voice sample that is analyzed and the content spoken by the caller to the merchant. Such unique voice characteristics for passive biometric voice analysis may include fundamental frequency, harmonic frequencies, acoustic energy patterns, identifiable differences when vowels and consonants are spoken, and other attributes that can be spectrally analyzed or evaluated electronically. Passive biometric voice analysis science and algorithms are known and not described further herein for the sake of brevity.

Given a sufficient voice sample, the device 152 can extrapolate the unique characteristics of the person's device and passively identify those characteristics in unrelated speech content to determine if the voice of a caller is the same or different voice from the voice sample. The voice sample may be recorded and analyzed by the device 152 as an enrollment step initiated by a merchant or card issuer as described further below. Since each person's voice is uniquely characterized in ways that the passive voice analysis can identify, a sufficient voice sample that may be successfully analyzed is sometimes referred to as a voiceprint that can distinguish one person from another in a manner akin to fingerprints that can be analyzed to distinguish one person from another. By determining matches (or not) between a caller's voice as later sampled in a conversation with a merchant and a previously analyzed voiceprint, the device 152 may authenticate and authorize a transaction to proceed or may flag apparently fraudulent activity before the conversation between the caller and merchant ends. The transaction is authorized to proceed only if the caller's voice corresponds to an authorized payment cardholder's voiceprint that is stored on the system.

As used herein, an authorized payment cardholder refers to an individual to which a payment card has been validly issued and/or a person who has been authorized by the cardholder and the bank to make transactions with the card. The authorized cardholder is the typically the person whose name is embossed on the front of the payment card and is the obligated payor for the account. Other authorized users may be named by the cardholder if the issuer agrees, and when more than one authorized user exists each authorized user may be enrolled and a respective voice sample may be obtained for each of them for use by the system to passively recognize their voices as described above. The authorized payment cardholder is legally responsible to the card issuer according to a cardholder agreement for purchases that are made and properly posted to the card account by anyone authorized to do so. In some cases, some authorized users of any particular card may be enrolled to the system 100 to complete a transaction while others authorized users may not.

Enrollment may include appropriate explanation of the biometric voice recognition features implemented by the system 100 and opt-in, informed consent by the authorized cardholder or user for the biometric voice recognition features, a collection of a voice sample for each user that once analyzed may serve as the voiceprint, and collection of complete card information needed to complete a payment card payment as the issuer requires. As mentioned above, the card information needed typically includes the name of card processor (e.g., Mastercard®, Visa®, American Express®), the name of the cardholder as it appears on the card, the primary account number (PAN) or the card number provided on the front of the card, the cardholder's billing address, card expiration information, and any security codes. In the case of additional authorized persons to use a particular card, information regarding those persons may be provided in the enrollment person so that the system 100 may identify which one of the authorized persons made any particular transaction that the system approved. Still other information may also be requested as part of the enrollment process as desired. The system may also include measures so as to avoid storage of data in a manner that would identify a specific individual (sometimes referred to as Personally Identifiable Information, or PII), but only identifies voice samples as being uniquely linked to specific payment card accounts or account identifiers. In this way, privacy is maintained for enrolled users of the system.

In different examples, the enrollment may be conducted by a merchant in an initial conversation with the caller, may be conducted by the issuer when issuing a payment card to the authorized payment cardholder, or may be self-completed by an authorized payment cardholder (or other authorized users) with a computer device that may communicate with the system 100. The information needed for the enrollment may be provided verbally or non-verbally. The voice sample may be taken (i.e., prompted to a user and recorded thereafter) by a merchant representative or a card issuer representative in a manual manner, may be taken by a computer device in the system 100 (e.g., voice biometric analysis device 152) in an automated manner, or may be taken by another person or device outside of the system 100 and thereafter sent to a device in the system 100 (e.g., the voice biometric analysis device 152) for analysis and comparison in the passive voice recognition described above. However provided, once obtained the voice sample is stored on a device in the system 100, together with the analysis of the voice sample to define a voiceprint including the unique voice characteristics that may be recognized by the system 100. When stored on the system 100, the voice sample and voiceprint are retrievable by the system for subsequent use and recall as needed to evaluate a caller's voice in a subsequent verbal conversation with the merchant.

Once the authorized cardholder (and any associated authorized users) are enrolled and analysis of the voice sample (or samples) of those users is initially made, the system 100 can recognize the voice of any of the authorized users in subsequent calls to the merchant. When the authorized cardholder or another authorized user calls a participating merchant (which may be the merchant that conducted the enrollment), the device 152 analyzes the caller's voice characteristics as exhibited in the sampled verbal conversation, and compares the analyzed caller's voice characteristics in the monitored verbal conversation to characteristics of a stored voice sample of the enrolled user to verify if the analyzed caller's voice characteristics match the characteristics of the stored voice sample of the authorized user.

If the analyzed caller's voice characteristics is verified by the device 152 to match the characteristics of the stored voice sample of an enrolled, authorized user of payment card, the system 100 knows that the caller is an authorized user of the associated payment card. The system 100 in this case approves the transaction and advises or notifies the merchant of the same. The merchant may in turn proceed with the transaction and the system may automatically retrieve the stored payment card information linked to the enrolled user to complete the transaction without the cardholder information being verbally exchanged between the caller and the merchant. On the other hand, if the analyzed caller's voice characteristics are not verified to match the characteristics of the stored voice sample of an enrolled, authorized user of a payment card, the system 100 knows that the caller is not an authorized user of a payment card. The system 100 can then deny the transaction and notify the merchant, card issuer or other party so that appropriate action can be taken.

The system 100 may include a plurality of enrolled authorized cardholders and stored voice samples for each of the plurality of enrolled payment card cardholders (and also any additional authorized users as described above) in the database 160. Participating merchants in the system 100 may in some cases be provided access the voice samples in the database for callers that have not previously called them, with their voice nonetheless being recognized by the system 100 as the voice of an authorized cardholder or authorized user of the card. In doing so, the voice biometric analysis device 152 may retrieve one or more voice samples from the database 160 and compare the analyzed caller's voice characteristics during the monitored conversation to one or more of the plurality of retrieved stored voice samples.

To facilitate the retrieval of the voice samples from the database 160 for comparison to a caller's voice, enrollment of authorized users may further include a caller identifier for each authorized user, and the caller identifier may be linked to the card and cardholder information needed to complete a transaction. The system 100 may accept the caller identifier when a call is made, and based on the accepted caller identifier select one or more of the plurality of stored voice samples from the database 160. The caller identifier may be, for example, the name of the caller, the caller's phone number, or any other identifier chosen by the authorized user, the merchant or the card issuer. In contemplated examples, the identifier may be an alphanumeric sequence that the user could enter on a keypad during the call without having to tell it to the merchant. However made, a caller identifier may allow efficient selection of the proper voice sample and/or voice sample analysis may be retrieved from a larger collection of authorized user voice samples and voice sample analysis in the database 160. A comparison of the caller's voice in the monitored conversation to a single voice sample provides the fastest and most efficient voice recognition analysis, and the caller identifier database organization of the voice samples is one way to obtain a single voice sample for comparison to a caller.

It is recognized that in certain embodiments a caller's voice could alternatively be compared to more than one voice sample to see if a match can be located, although this is only practical for a small number of voice samples to be compared to a caller's voice. When the voice sample analysis and comparisons made involve multiple characteristics of the caller's voice to an analyzed voice sample, opportunities exist for the system 100 to intelligently self-select only the most likely samples to be a match to be compared. For instance, many, if not most, of the stored voice samples in the database 160 can quickly be eliminated in a characteristic-by-characteristic comparison, quickly and successively leaving a much smaller number of possible matches to be compared. Grouping tools in the database can also be included to organize and efficiently either eliminate voice samples from consideration or more quickly narrow down possible voice sample matches from a larger collection in the database 160.

For example, and relatively speaking, a lower human voice will tend to exhibit a lower fundamental frequency while a higher human voice will tend to exhibit a higher fundamental frequency, so once the system 100 establishes a baseline frequency for a caller's voice the system 100 can eliminate voice samples having a substantially higher or lower baseline frequency. That is, the system 100 may now only consider the smaller collection of voice samples that have a fundamental frequency close to the caller that is speaking in the monitored phone call. As a further example, an adult male voice on average is about an octave below a "middle C" frequency of about 261.6 Hz, and an adult female voice on average is about an octave above the "middle C" frequency, so an average adult male voice can quickly be distinguished from an average adult female voice to facilitate matches with adult male voice samples and adult female voice samples. Once this is done, the system 100 can proceed one-by-one to eliminate or continue to consider voice samples based on other parameters such as distinctive harmonic frequency characteristics exhibited in the caller's voice, acoustic energy speech patterns exhibited in the caller's voice, and other voice attributes can also recognized and provide a basis to exclude or include voice samples for further consideration. In some cases, an exact match can be made relatively quickly between a caller's voice and a voice sample even when the number of stored voice samples is large.

When the caller's voice is confirmed as a match to the analyzed voice sample of the authorized card user, the system 100 may retrieve the associated card information and communicate it to the payment device 156 of the system 100, which in turn may communicate with a payment network 158 of the card issuer to complete the payment. The communication of card or cardholder information to the payment device 156 and network 158 may be made with the card information stored on file in the system 100, without the caller having to provide it and without the merchant representative having to collect it or input it to the payment device 156 in the conversation being monitored. As such, the system 100 can authenticate and authorize payment card payments for transactions conducted in monitored conversations in less time, with no opportunity for human error, with improved convenience to both callers and merchants, and with more pleasant user experiences. Unlike conventional practices described above, possession of the payment card is not required to complete a transaction and related inconveniences and delay in physically locating the card is avoided. Card information including account numbers and details need not be provided, and the system does not rely upon passwords, PINs or security questions that a caller may confuse or not remember. Associated inconvenience and delay that may otherwise occur is entirely avoided.

The client device 154 in contemplated embodiments may be used for authorized cardholder enrollment (and authorized user enrollment) by any party described above, or for other use by card issuers, payment network personnel, or system administrators. In contemplated embodiments the client device 154 may be utilized to, for example, enroll participating merchants and communicate merchant information to the other devices in the system 100, retrieve data from one or more of the system devices to assess its performance, troubleshoot the system, perform system updates, etc. The client device may 154 be, but is not necessarily limited to, a computer workstation, a personal computer, a laptop or notebook computer, a tablet device or a smartphone.

The payment device 156 accepts payment card payment requests and performs payment processing for authenticated and authorized transactions described above with biometric voice recognition analysis. The payment system 156 communicates with a payment network 158 to process and approve the request for payment in the applicable amount. While a separate payment device 156 is shown in FIG. 1, another device in the system may alternatively communicate with the payment network 158 without first passing through a dedicated payment device 156.

In a variety of contemplated examples, different combinations of devices, being the same or different from one another, may be utilized in the system 100 with otherwise similar effect. One or more of the devices 102, 120, 152, 154 and 156 shown in FIG. 1 may be a mobile device, such as any mobile device capable of interconnecting to the Internet including a web-based phone, also referred to as smart phone, personal digital assistant (PDA), a tablet, or other web-based connectable equipment. Alternatively, one or more of the devices 102, 120, 152, 154 and 156 may be a desktop computer or a laptop computer. Each of the devices 102, 120, 152, 154 and 156 may be associated with a different user as described. Each device 102, 120, 152, 154 and 156 may be interconnected to the Internet through a variety of interfaces including a network, such as a local area network (LAN) or a wide area network (WAN), dial-in connections, cable modems and special high-speed ISDN lines.

Figure 2:
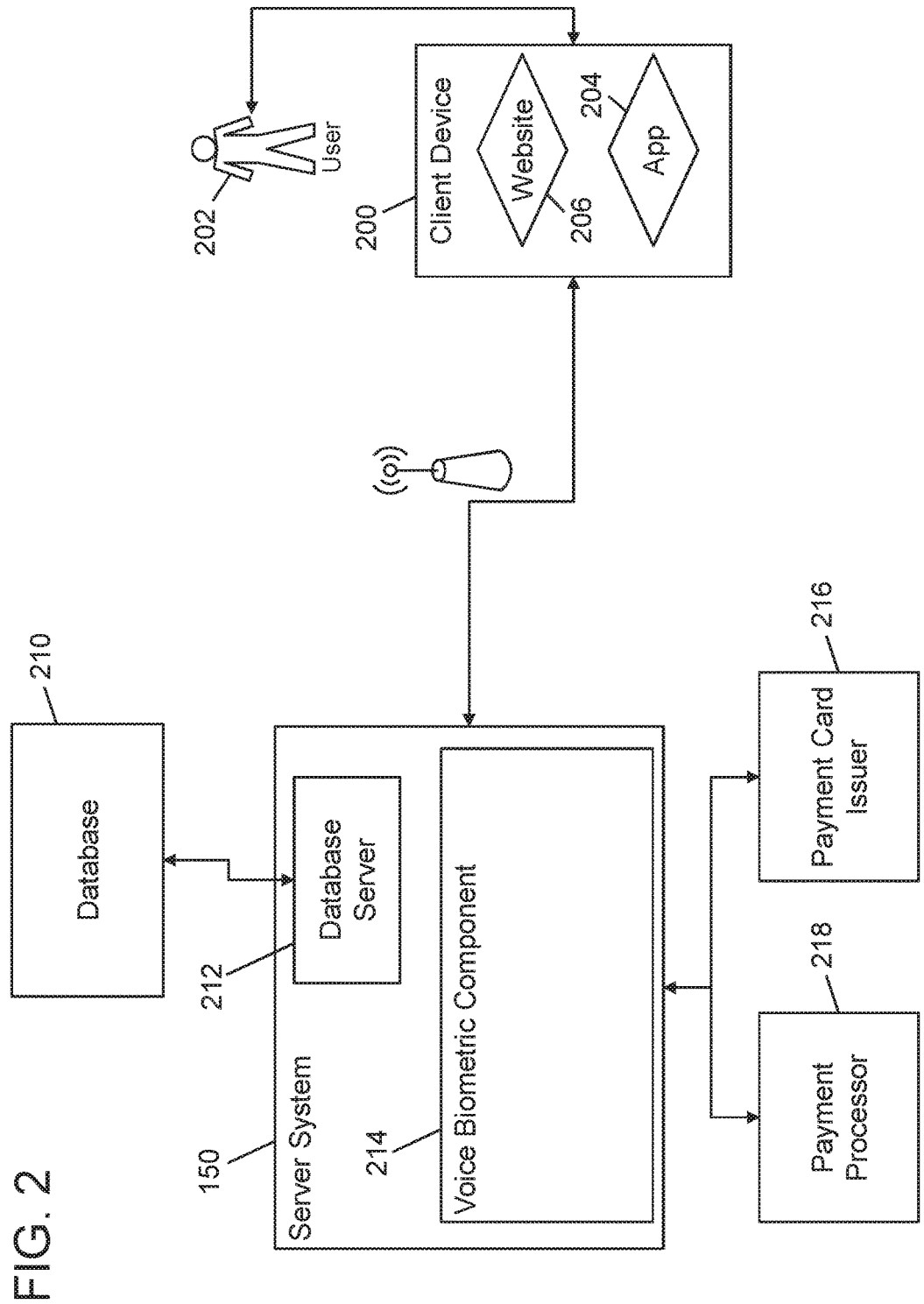
FIG. 2 is a simplified block diagram of a portion of the biometric analysis system shown in FIG. 1.

FIG. 2 is a simplified block diagram of a portion of the authentication and verification system 100 that includes server system 150. Server system 150 includes a voice biometric computing component 214 for analyzing the characteristics of voice samples and the voice characteristics of callers in monitored conversations. Voice biometric computing component 214 is in communication with at least one device 200 that may represent the respective devices 102, 120, 154 and 156 described above. The device 200 shown may be associated with a user 202, and the user 202 may represent one of the users of the various devices 102, 120, 154 and 156 described above.

For instance, when the device 200 is the caller device 102 the user 202 is the caller. When the device 200 is the recipient device 120 the user 202 may be the merchant. When the device 200 is the client device 154 the user 202 may be a system administrator. When the device 200 is the payment device 156, the user 202 may be an agent of the payment provider.

In some embodiments, the device 200 includes a software application 204 (i.e., a service app) installed on the device 200. In additional embodiments, the device 200 displays a customized website 206 using a web browser installed on the device 200. As described above, voice biometric computing component performs passive voice recognition analysis to a caller's voice when conversing with the merchant.

In the example embodiment, server system 150 is in communication with a payment processor 218 and/or a payment card issuer 216. Payment processor 218 and/or server system 150 may be associated with an interchange network (not shown). Server system 150 is configured to receive transaction data from payment processor 218.

Server system 150 includes a database server 212 connected to a database 210, which contains information including voice sample, voice sample analysis, and payment card information for authorized and enrolled cardholders. In one embodiment, database 210 is centralized and stored on server system 150. In an alternative embodiment, database 210 is stored remotely from server system 150 and may be non-centralized. Database 210 may store transaction data including data relating to merchants, merchant locations, cardholders and authenticated or non-authenticated voice comparisons. Specifically with respect to the system 100, the database 210 may include a plurality of files of information for enrolled cardholders and authorized users of cards, voice samples, voice analysis and caller identifiers per grouping tools utilized to retrieve the voice samples and voice analysis to be compared, as well as related card information on file when a caller's voice is recognized.

In the example embodiment, server system 150 is configured to receive transaction data from payment processor 218. Voice biometric computing component 214 is configured to recognize a caller's voice (or not) by comparison of the caller's voice to an analyzed voice sample. If a match is determined the voice biometric computing component 214 generates and sends digital confirmation and proof of caller authentication to the payment device 216. The payment device 216 may receive the proof of caller authentication as part of an authorization request to complete the payment transaction.

In one example, ISO® 8583 compliant messages and ISO® 20022 compliant messages may be generated and exchanged as payment processing is initiated and completed. As used herein, "ISO®" refers to a series of standards approved by the International Organization for Standardization (ISO is a registered trademark of the International Organization for Standardization of Geneva, Switzerland). ISO® 8583 compliant messages are defined by the ISO® 8583 standard which governs financial transaction card originated messages and further defines acceptable message types, data elements, and code values associated with such financial transaction card originated messages. ISO® 8583 compliant messages include a plurality of specified locations for data elements. ISO® 20022 compliant messages are defined by the ISO® 20022 standard. For example, ISO® 20022 compliant messages may include acceptor to issuer card messages (ATICA). Data and information in the ISO® 8583 and ISO® 20022 may be used by issuers to score transactions in terms of assessed risk of fraud. The authentication of the caller's identity via voice recognition performed by the system may be taken as assurance of a reduced risk of fraud when represented in an ISO® 8583 and/or ISO® 20022 message.

If no match is made, the voice biometric computing component 214 in one example generates and send digital notice to the merchant and card issuer that the caller has not been authenticated and that payment cannot proceed. The notice shall also be an alert of potential fraudulent activity that should be promptly investigated and resolved to the satisfaction of the authorized cardholder and the issuer. In another example, a payment request may still be made, but the non-authentication of the caller's identity via voice recognition performed by the system may be taken as an increased risk of fraud when represented in an ISO® 8583 and/or ISO® 20022 message, but may or may not result in denial of the payment as other factors and considerations are also taken into account.

Although only one payment card issuer 216, one payment processor 218, one user 202, and one client device 200 are illustrated, it should be understood that the cardholder authentication and verification system may include any number of payment card issuers 216, users 202, payment network 218, and/or devices 200 in communication with server system 150.

Figure 3:
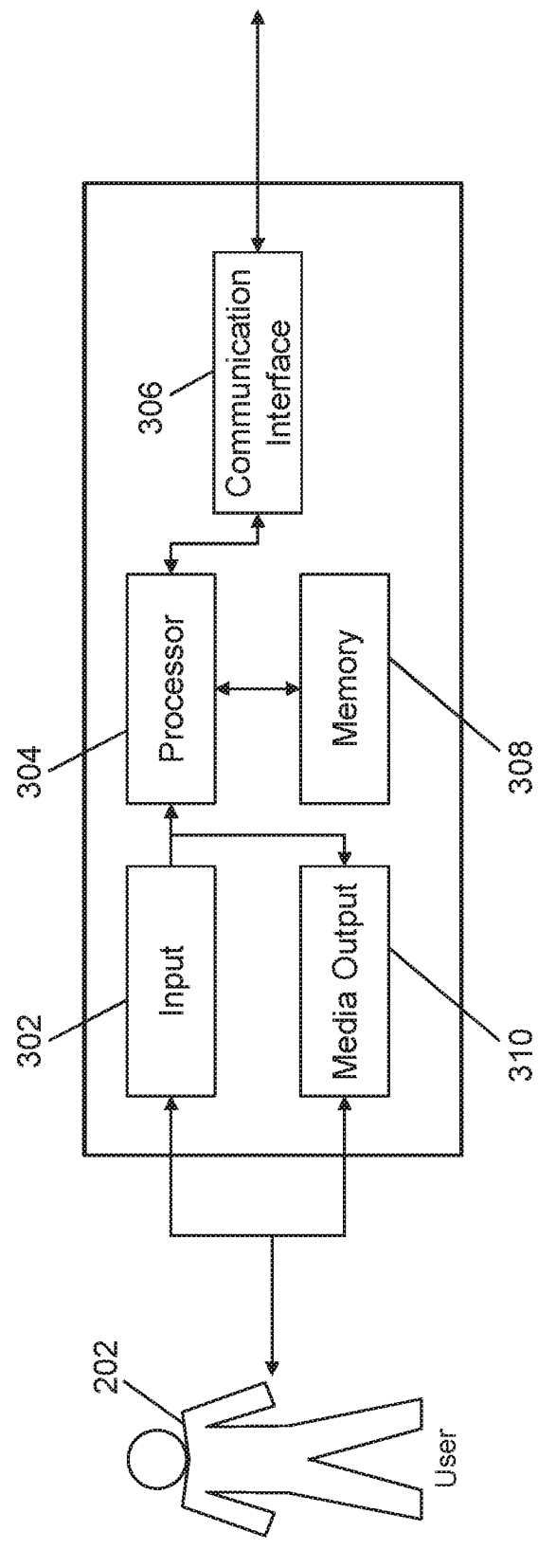
FIG. 3 illustrates an example configuration of a user device for the system shown in FIGS. 1 and 2.

FIG. 3 illustrates an example configuration of a device 200 operated by a user 202, such as any of the users described above. User system 200 may include, but is not limited to, a smart phone, a tablet, and a website. In the example embodiment, device 200 includes a processor 304 for executing instructions. In some embodiments, executable instructions are stored in a memory area 308. Processor 304 may include one or more processing units, for example, a multi-core configuration. Memory area 308 is any device allowing information such as executable instructions and/or written works to be stored and retrieved. Memory area 308 may include one or more computer readable media.

The device 200 may also include at least one media output component 310 for presenting information to user 202. Media output component 310 is any component capable of conveying information to user 202. In some embodiments, media output component 310 includes an output adapter such as a video adapter and/or an audio adapter. An output adapter is operatively coupled to processor 304 and operatively couplable to an output device such as a display device, a liquid crystal display (LCD), organic light emitting diode (OLED) display, or "electronic ink" display, or an audio output device, a speaker or headphones.

In some embodiments, the device 200 includes an input device 302 for receiving input from user 202. Input device 302 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 310 and input device 302. The device 200 may also include a communication interface 306, which is communicatively couplable to a remote device such as the payment processor. Communication interface 306 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN).

Stored in memory area 308 are, for example, computer readable instructions for providing a user interface to user 202 via media output component 310 and, optionally, receiving and processing input from input device 302. A user interface may include, among other possibilities, a web browser and client application. Web browsers enable users, such as user 202, to display and interact with media and other information typically embedded on a web page or a website. An application allows user 202 to interact with a server application from a server system.

Figure 4:
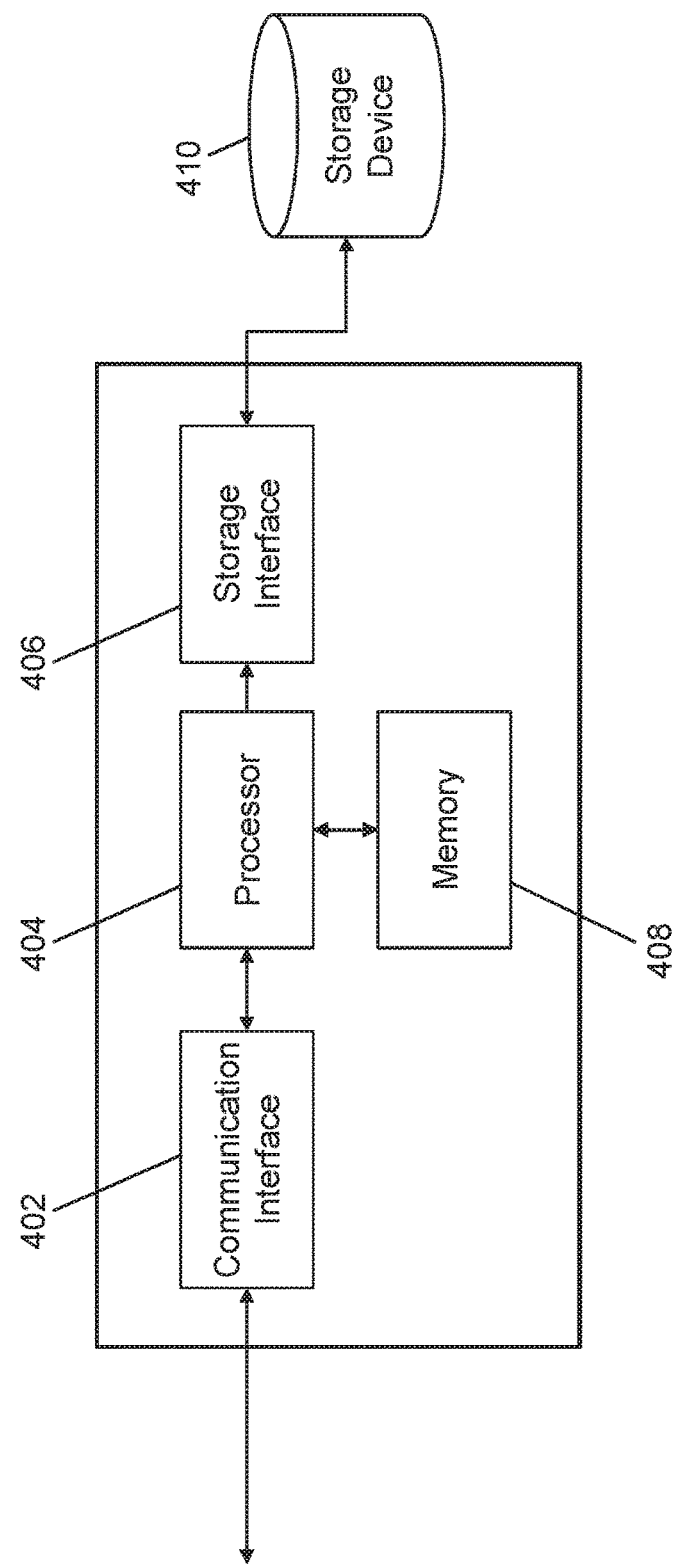
FIG. 4 illustrates an example configuration of a server system as described herein.

FIG. 4 illustrates an example configuration of a server system such as a server system 150 as described herein. Server system 150 is a database used and managed by at least one of a merchant and a third party, and used to store user account data, and send, receive, and process signals from various sources. Server system 150 includes a processor 404 for executing instructions. Instructions may be stored in a memory area 408, for example. Processor 404 may include one or more processing units (e.g., in a multi-core configuration) for executing instructions. The instructions may be executed within a variety of different operating systems on the server system 150, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 404 is operatively coupled to a communication interface 402 such that server system 150 is capable of communicating with a remote device such as any of the devices 200 described above or another server system 150. For example, server system 150 may be a server system, wherein communication interface 402 may receive data from payment processor 218.

Processor 404 may also be operatively coupled to a storage device 410. Storage device 410 is any computer-operated hardware suitable for storing and/or retrieving data. In some embodiments, storage device 410 is integrated in server system 150. For example, server system 150 may include one or more hard disk drives as storage device 410. In other embodiments, storage device 410 is external to server system 150 and may be accessed by a plurality of server systems 150. For example, storage device 410 may include multiple storage units such as hard disks or solid state disks in a redundant array of inexpensive disks (RAID) configuration. Storage device 410 may include a storage area network (SAN) and/or a network attached storage (NAS) system.

In some embodiments, processor 404 is operatively coupled to storage device 410 via a storage interface 406. Storage interface 406 is any component capable of providing processor 404 with access to storage device 410. Storage interface 406 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 410.

Memory area 408 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM).

The above memory types are exemplary only, and are thus not limiting as to the types of memory usable for storage of a computer program.

Figure 5:
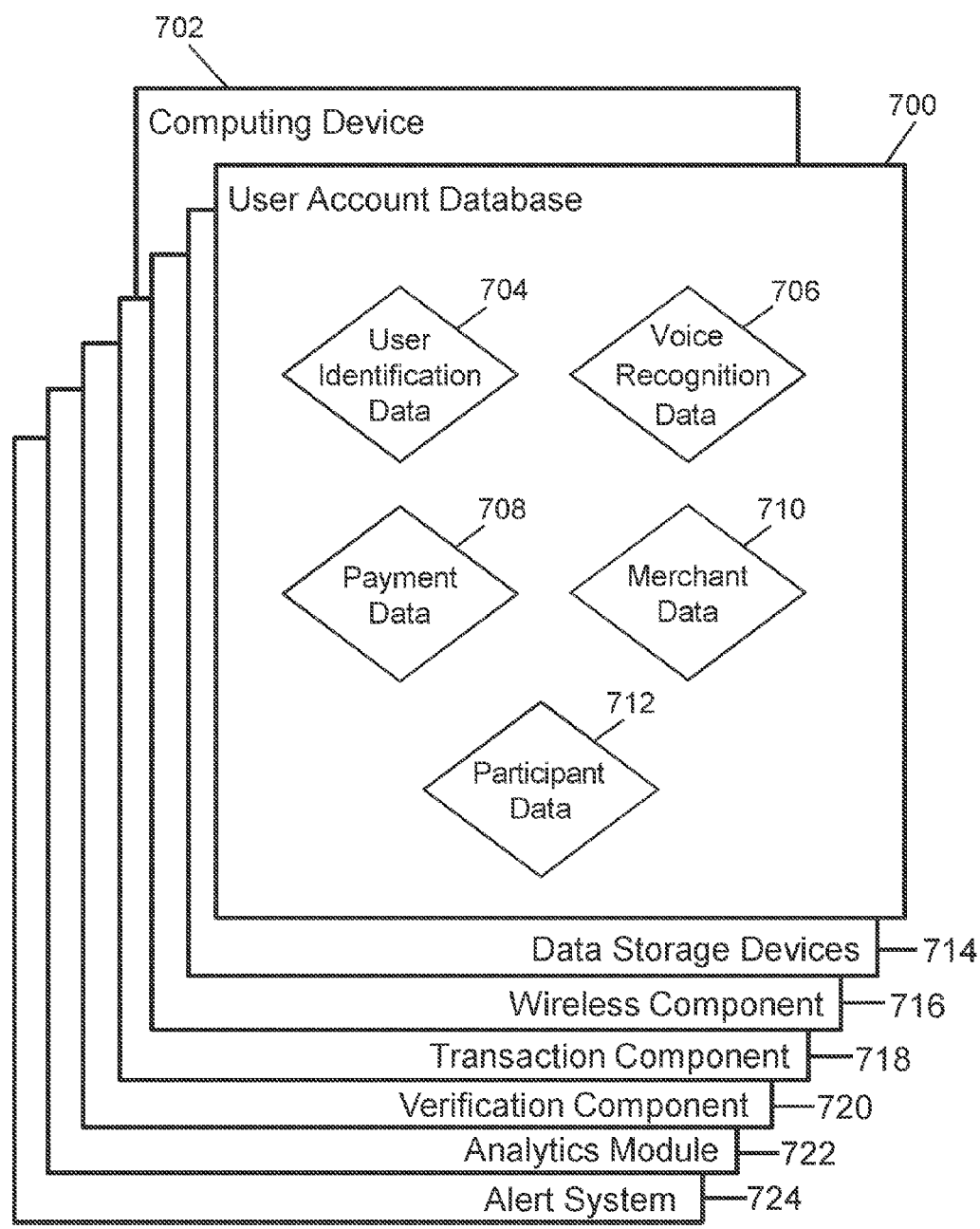
FIG. 5 shows an example configuration of a user account database within a computing device, along with other related computing components, that may be used to create, organize, and monitor a plurality of user data associated with a user.

FIG. 5 shows an example configuration of a user account database 700, within a computing device 702, along with other related computing components, that may be used to create, organize, and monitor a plurality of user data associated with a user account. In some embodiments, computing device 702 is the same or similar to server system 150. User account database 700 is coupled to several separate components within computing device 702, which perform specific tasks.

In the example embodiment, database 700 includes user identification data 704, voice recognition data 706, payment data 708, merchant data 710, and participant data 712. In contemplated embodiments, user identification data 704 includes, but is not limited to, a user name, a user address, and a user phone number. When the user is an enrolled cardholder or an authorized user of a card, the user identification data may further include the voice sample and card information discussed above needed to complete a payment card payment. Voice recognition 706 includes data associated with the passive voice recognition analysis described above. Payment data 708 includes, but is not limited to, card information, payment history, and a billing address. Merchant data 710 includes information associated with participating merchants, including merchant identifiers, address information, contact information, etc. Participant data 712 includes data associated with third party information (e.g., system administrators).

Computing device 702 includes the database 700, as well as data storage devices 714. Computing device 702 also includes a wireless component 716 for receiving an audio feed for the monitored conversation, and voice biometric components for analyzing the caller's voice. Computing device 702 also includes a transaction component 718 for correlating, for example, payment card transactions with authenticated callers that are authorized cardholders enrolled on the system. An analytics module 722 is included for analyzing transactions, enrollment status, success and failure rates of voice recognition attempts, time to complete transactions and other items of interest. Further included is a verification module 720 that may communicate with a payment to device to verify caller identification as an enrolled and authorized cardholder. Computing device 702 also includes an alert module 724 for transmitting an alert to a cardholder, merchant or an issuer, or to any other interested party so that possible fraudulent activity may be timely investigated and resolved.

Figure 6:
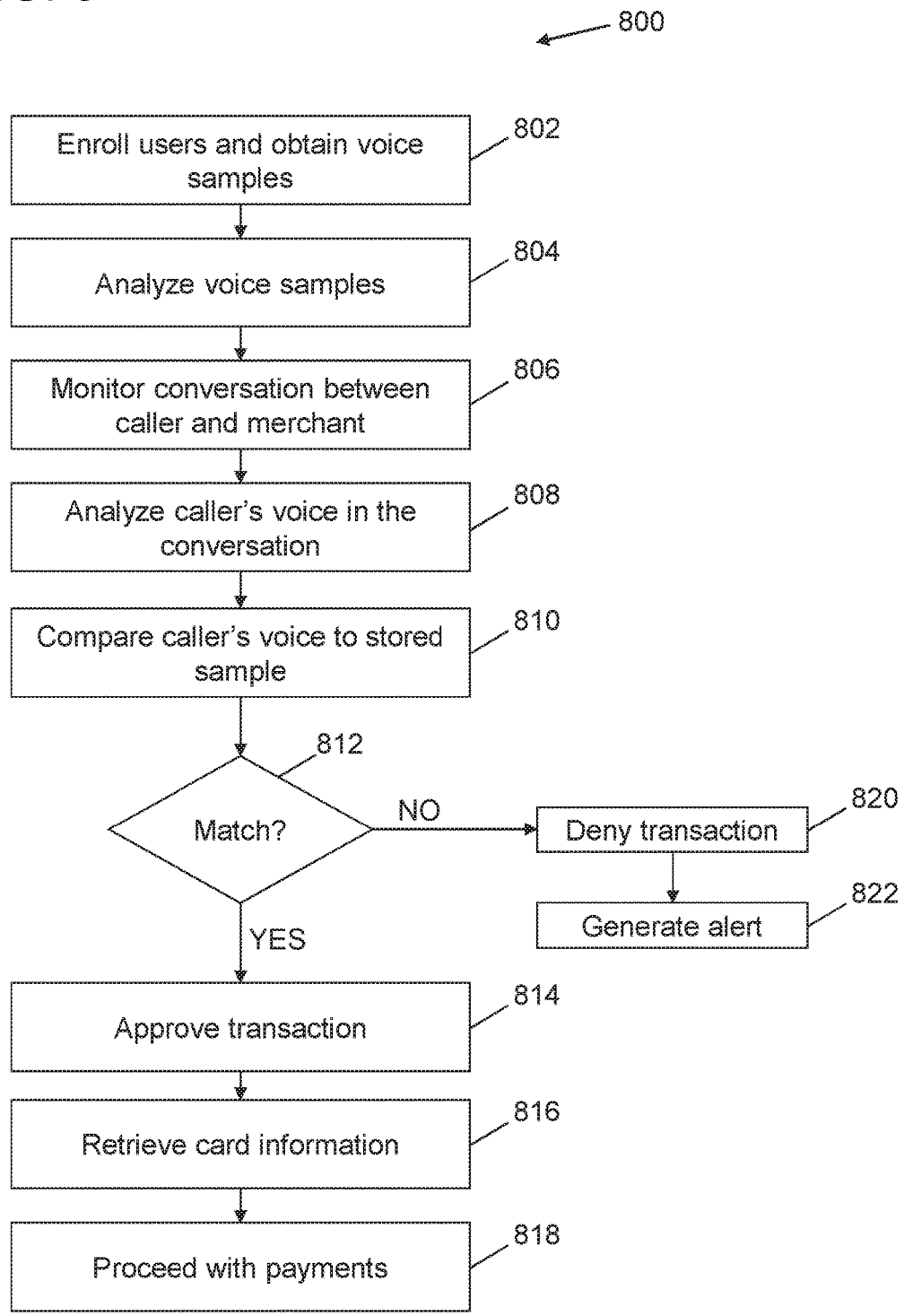
FIG. 6 is an example of a method performed using the biometric analysis system shown in FIG. 1.

FIG. 6 is an example of an authentication and verification method 800 for a verbal transaction between a caller and a merchant over a communications network utilizing the authentication and verification system 100 shown in FIG. 1. including the passive voice biometric analysis device 152 described above.

At step 802, the method includes appropriate explanation and obtaining opt-in, informed consent to the biometric voice recognition authentication features of the system and the use of personal data by the system for the limited purposes of authentication as described herein, enrolling consenting users and obtaining recorded voice samples, and storing them on the system as described above. The enrolled users include participating merchants, authorized cardholders, and authorized users of the cards as described above. Step 802 includes collecting the merchant information, and accepting cardholder and card information needed by the system as described above in order to complete a transaction. Step 802 may be performed by any of the parties described above and utilizing one of the devices describe above. The recording of the voice samples may be made a system device or another device as described above and sent to the system 100 in any manner desired. The step 802 shall also include storing and organizing the enrollment information and recorded voice samples for efficient selection and retrieval of the information when needed by the system 100. Assignment or collection of caller identifiers and the like to facilitate subsequent retrieval of information shall also be included in step 802. The storage of the voice samples is made in a manner that links the voice samples to respective authorized users and their card information for ease of retrieval to facilitate the voice recognition validation described.

At step 804, the voice samples obtained via step 802 are analyzed. The analysis is performed by a device in the system 100 (e.g., the device 152 described above) to identify the unique characteristics of the user's voice from each of the stored samples. The analyzed voice samples may also be stored on the system as described above, and in some embodiments the analyzed samples may be organized according to identified characteristics in the database 160. Using the analyzed voice samples, the system can verify customers as enrolled and authorized payment card users in subsequent phone calls. As mentioned previously, the storage of voice print samples and analysis data may be made in a manner that would avoid identifying a specific individual (sometimes referred to as Personally Identifiable Information, or PII), but instead may identify voice samples as being uniquely linked to specific payment card accounts or account identifiers, as opposed to specific persons. In this way, privacy is maintained for enrolled users of the system.

At step 806, when a conversation commences over the network 140 between a customer/caller and a merchant, the system monitors or samples a portion of the conversation in order to determine the characteristics of the caller's voice to compare to previously analyzed characteristics. Specifically, the system monitors a portion of the audio feed of the caller, and at step 808 the system analyzes the caller's voice to identify its unique characteristics utilizing passive voice recognition techniques and the device 152 as described above. The sampling of the conversation may be continuous or intermittent, and is made only in an amount sufficient to reliably determine the characteristics of the caller's voice needed to make the necessary comparison(s). As such, once a sufficient sampling of the caller's voice is obtained to do so, the system ceases to monitor the conversation. As such, privacy concerns of the parties to the conversation are respected.

At step 810 the analyzed caller's voice is compared to at least one of the analyzed voice samples from steps 802 and 804 to see if the characteristics are a match. As such, the system may verify if the caller is an enrolled and authorized user per step 802. As discussed above, the comparison at step 810 may be made to a single voice sample (as analyzed at step 804) or to a plurality of voice samples (as analyzed at step 804). Caller identifiers and the like may be accepted in order for the comparison at step 810 to be made in reference to a selected one of the voice samples (as analyzed at step 804) of an enrolled user.

At step 812, if the compared analyzed caller's voice characteristics from step 810 match the analyzed characteristics of the stored voice sample(s) at step 804, the caller's identity is confirmed to be an authorized user by the system. The system then approves the transaction at step 812 and advises or notifies the merchant/recipient of the caller's identity confirmation, as well as retrieves the card information at step 218 and proceeds with the payment at step 818. The approval at step 812 may include sending a notification to the card issuer that the transaction has been authenticated and validated via the passive voice recognition analysis of steps 808 and 810. As described above, approval may include generate of ISO® 8583 and/or ISO® 20022 compliant messages as desired. Records regarding the approval at step 814, card information retrieval at step 816 and payment details at step 218 may be generated and stored in the system as desired. Payment per step 818 may be made by communicating with a payment device that in turn will communicate with a card issuer payment network. The payment device may send payment confirmation back to the system 100 for record keeping purposes.

If at step 812, the compared analyzed caller's voice characteristics at step 810 does not match the analyzed characteristics of the stored voice sample(s) at step 804, the caller is not confirmed to be an authorized user by the system. The system then advises or notifies the merchant/recipient that the caller's identify is not confirmed and denies the transaction at step 820, and at step 822 generates an alert. The alert generated may flag an error condition in the system or may flag possibly fraudulent activity. The alert (or alerts) at step 822 may be sent to any party desired in any manner so that appropriate action or actions may be taken in response. Records regarding any alerts generated at step 822 may be generated and stored in the system as desired.

In some embodiments, when the caller identity is not confirmed the merchant may nonetheless cause a payment authorization request to be made to the payment processor of the card, but such payment authorization request shall include the non-authentication of caller identify in an ISO® 8583 and/or ISO® 20022 compliant message to the card processor. The payment processor is therefore made aware of the non-authentication of caller identify, which may be considered by the payment processor with other factors or consideration for ultimate approval or denial of the transaction, or as a basis for generating an alert for further investigation. As such, non-authentication of a caller's identity as an enrolled user of the system does not in all cases mean that the merchant cannot proceed or that a request for payment will not still be approved by a payment processor for any particular card. Some tolerance of caller identification features may be afforded if other considerations point to a system error in identifying a caller or another reason to believe that a call is not fraudulent.

As will be appreciated based on the foregoing specification, the above-described embodiments of the disclosure may be implemented using computer programming or engineering techniques including computer software, firmware, hardware or any combination or subset thereof, wherein the technical effects described above are achieved. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A voice biometric analysis system for authenticating a customer as an authorized payment card user to a merchant over a communications network, the system comprising:
   a passive voice biometric analysis device configured to:
      store a plurality of respective voice samples of enrolled authorized payment card users;
      sample a verbal conversation between the customer and the merchant over the communications network;
      analyze the customer's voice characteristics from the sampled verbal conversation;
      compare, during the sampled verbal conversation, the analyzed customer's voice characteristics in the sampled verbal conversation to characteristics of at least one of the stored voice sample to authenticate the customer as one of the enrolled authorized payment card users; and
      advise the merchant whether the customer has been authenticated as an enrolled authorized payment card user.

2. The voice biometric analysis system of claim 1, wherein the sampled verbal conversation includes a verbal purchase request from the customer and a request for payment with a payment card, and wherein the passive voice biometric analysis device is further configured to:
   if the identity of the customer is verified as an enrolled authorized payment card user, automatically retrieve stored payment card information linked to the stored voice sample of the enrolled authorized payment card user so that the request for payment with a payment card may be processed without payment card information being verbally exchanged in the conversation.

3. The voice biometric analysis system of claim 1, wherein the passive voice biometric analysis device is further configured to:
   if the identity of the customer is not authenticated as an enrolled authorized payment card user, generate an alert to the merchant.

4. The voice biometric analysis system according to claim 1, wherein the passive voice biometric analysis device is further configured to record the voice samples as the authorized payment card users are being enrolled.

5. The voice biometric analysis system according to claim 1, wherein the passive voice biometric analysis device is further configured to analyze the stored voice samples.

6. The voice biometric analysis system according to claim 1, wherein the passive voice biometric analysis device comprises a server system.

7. The voice biometric analysis system according to claim 1, further comprising a database, the database including the plurality of stored voice samples, and the passive voice biometric analysis device configured to select at least one of the plurality of stored voice samples in the database based on the analyzed customer's voice characteristics in the sampled verbal conversation.

8. The voice biometric analysis system according to claim 1, wherein the system is further configured to generate at least one of an ISO 8583 compliant message or an ISO 20022 compliant message that includes a biometric flag indicating that a biometric analysis has been performed on the customer's voice.

9. The voice biometric analysis system according to claim 1, further comprising a payment device in communication with the passive voice biometric analysis device.

10. The voice biometric analysis system according to claim 9, wherein the payment device is a payment card payment device communicating with a payment network.

11. A caller authentication method for a verbal transaction between a customer caller and a merchant recipient over a communications network, the method implemented with a passive voice biometric analysis device, the method comprising:
storing a plurality of respective voice samples of enrolled authorized payment card users;
sampling a verbal conversation between the customer and the recipient over the communications network;
analyzing the customer's voice characteristics from the sampled verbal conversation;
comparing, during the conversation, the analyzed customer's voice characteristics in the sampled verbal conversation to characteristics of at least one of the stored voice samples to authenticate the customer caller as one of the enrolled authorized payment card users; and
advising the merchant recipient whether the customer caller has been authenticated as an enrolled authorized payment card user.

12. The caller authentication method of claim 11, wherein the verbal conversation includes a verbal purchase request from the customer caller and a verbal request for payment with a payment card, and wherein the method further comprises:
if the identity of the customer caller is verified as an enrolled user, automatically retrieving stored payment card information linked to the enrolled user without the cardholder information being verbally exchanged between the customer caller and the merchant recipient.

13. The caller authentication method of claim 11, further comprising:
if the identity of the customer caller is not verified as an enrolled user, generating an alert to the merchant recipient.

14. The caller authentication method of claim 11, further comprising, recording the voice samples as authorized payment card users are enrolled.

15. The caller authentication method of claim 11, further comprising analyzing the stored voice samples.

16. The caller authentication method of claim 11, further comprising accepting payment card information, and storing the payment card information in a manner linked to the stored voice sample of each enrolled authorized payment card user.

17. The caller authentication method of claim 11, further comprising:
storing a plurality of stored voice samples for a plurality of enrolled authorized payment card users in a database; and
selecting at least one of the plurality of stored voice samples in the database based on the analyzed customer's voice characteristics from the sampled verbal conversation.

18. The caller authentication method of claim 17, further comprising:
generating at least one of an ISO 8583 compliant message or an ISO 20022 compliant message.

19. The caller authentication method of claim 11, further comprising communicating with a payment device.

20. The caller authentication method of claim 19, further comprising communicating with a card issuer payment network.

* * * * *